United States Patent [19]

Brown

[11] 3,968,302

[45] July 6, 1976

[54] MOLD RELEASE COMPOSITION CONTAINING TUNGSTEN DISULFIDE

[75] Inventor: Richard E. Brown, Boulder, Colo.

[73] Assignee: Ball Brothers Research Corporation, Boulder, Colo.

[22] Filed: May 30, 1975

[21] Appl. No.: 582,311

Related U.S. Application Data

[62] Division of Ser. No. 444,434, Feb. 21, 1974, Pat. No. 3,915,870.

[52] U.S. Cl. ................................ 428/328; 65/26; 428/323; 428/335; 428/336; 428/469; 428/470; 428/472; 428/450

[51] Int. Cl.² .................. B32B 5/16; C10M 1/10; C03B 39/00

[58] Field of Search ................ 106/38.27, 38.28; 252/28, 30, 49.5; 428/450, 323, 472, 328, 470, 469, 336, 335; 65/26

[56] References Cited
UNITED STATES PATENTS

| | | | |
|---|---|---|---|
| 2,246,463 | 6/1941 | Garratt | 65/26 |
| 2,901,380 | 8/1959 | Crump | 428/472 |
| 3,079,204 | 2/1963 | Lamson | 252/28 |
| 3,242,076 | 3/1966 | Hagan | 65/26 |
| 3,285,850 | 11/1966 | Graham | 252/28 |
| 3,341,454 | 9/1967 | Chor | 252/22 |
| 3,496,003 | 2/1970 | Simon-Vermot | 252/25 |
| 3,522,177 | 7/1970 | Benz | 252/33 |
| 3,874,862 | 4/1975 | Bickling | 65/26 |

*Primary Examiner*—Harold Ansher
*Assistant Examiner*—Ellis P. Robinson
*Attorney, Agent, or Firm*—Gilbert E. Alberding

[57] ABSTRACT

A composition and method of preparation are herein described for molten release and parting compositions adaptable for use in glass-forming operations. The novel composition comprise a mixture containing tungsten disulfide, a silicate and a setting agent. A preferred composition comprises a mixture of tungsten disulfide and graphite with sodium silicate and zinc oxide as a setting agent.

5 Claims, No Drawings

MOLD RELEASE COMPOSITION CONTAINING TUNGSTEN DISULFIDE

This application is a Division of U.S. Ser. No. 444,434, filed Feb. 21, 1974, now U.S. Pat. No. 3,915,870.

BACKGROUND OF THE INVENTION

1. Field of the Invention

The present invention relates to novel compositions of matter and methods of using said compositions. More particularly, it relates to compositions of matter useful as mold release and parting agents for protecting and lubricating the surfaces of molds, plungers, and other article-forming parts, especially such as are useful in the manufacture, forming, and handling of glass articles or the like at high temperatures.

2. Description of the Prior Art

Before situating new molds into use, the glass industry has generally adapted the process of using various compositions applied to the mold-forming surfaces. While these compositions and methods of application have been successful as a preliminary treatment, many difficulties have been observed in the subsequent treatment of the molds during operation in the molding machines.

In glass manufacturing, a glob of molten glass is formed by a blank mold into the parison having a finished portion corresponding to the neck portion of the desired glass article. It is a requirement that the molding surface of the blank mold not become abraded or pitted so that the molten glass will readily flow over the molding surface of the mold, take the shape thereof, and then separate therefrom. As can be appreciated, this process creates a dragging or abrasive effect upon the molding surface of the glass-forming equipment. While the working temperatures of the glass-forming machine may vary from about 500° to 1000°F., in the glass industry, it often reaches 1200°F. Generally, during the final process of shaping and forming, the molten glass is allowed to cool to a temperature between about 1250°F., to 1350°F. Therefore, any molds and release compositions must be compatible with and effective at these temperatures.

Several practices have been followed in the past for the protection and lubrication of such molds used in forming glass articles. The common practice in most cases in the glass factories has been to use for this purpose a compound of bulk of which consists of light paraffin base oil and containing graphite in suspension, in most cases in the glass factories. These light paraffin base oils are numerous in kinds and such hydrocarbons as kerosene have been employed. Generally, these compositions are applied by spraying, painting, or swabbing during the forming operation so as to provide lubrication of the interacting mold sections to prevent sticking of the molten glass to the mold surfaces. While the spray of oil carrying the lubricant such as graphite may be used at these temperatures, there are many important objections to the use of the light paraffin base oil. It is used primarily as a carrier for the graphite and quickly volatilizes on the hot surfaces of the molds. Thus, it will be appreciated that this presents drawbacks in such compositions containing these oils as well as their method of application. Aside from the obnoxious odors, the vaporized materials create considerable volumes of smoke which reduce visibility, and produce upon condensation serious fire hazards which oftentimes become progressively worse as the accumulation increases. Further, as a result of the evaporation of so much oil from the glass-forming surfaces, there is a tendency for hard carbon deposits to build up on such mold surfaces thus producing inferior glassware and even more serious troubles. It should be added that the storage of the necessary substantial quantities of oil is a nuisance in a glass factory and of course the cost of the oil is a considerable item. The application of these conventional compositions to various moving parts of the machine in actual production must be regularly repeated a number of times on a periodic basis which could result in injury to operators. Needless to say, these problems have required that the industry employ other solutions to circumvent these undesirable conditions. Further discussions of the long existing problems with such compositions and efforts to avoid these problems can be found in U.S. Pat. Nos. 3,141,752; 3,480,422; 3,508,893; 3,523,016 and 3,623,556.

Because of these objections to the use of paraffinic materials various attempts have been made to use a solution or suspension of a lubricant in an aqueous system. A number of aqueous systems have been employed with various degrees of success. While such a solution is useful in the preliminary treatment where the application is made at temperatures substantially lower than 500°F., it has not been found satisfactory for use during subsequent treatment where the mold temperature is necessarily higher, usually over 825°F. This is due to the fact that the small drops of water striking the hot surfaces are converted into steam with almost explosive violence, carrying with it mechanically the lubricant which has been in solution or suspension in the water. Thus, instead of adhering to the mold surface, most of the lubricant falls away and is wasted. The use of various binders which resolve this problem by fusing and bonding the lubricant to the moldforming surface have been suggested. Because of the rigorous operating conditions and high temperatures encountered in glass-forming operations, numerous compositions employing lubricants in conjunction with various binders have only been moderately utilized by those skilled in the art. The subject invention deals with one approach for precoating molds and molding parts with an aqueous dispersion, especially applicable to the glass-forming machines.

SUMMARY OF THE INVENTION

One departure which the subject invention contemplates from prior attempts is to explore thermally stable lubricants in conjunction with various carriers which offer a release and lubricating composition that can readily adhere to very hot working surfaces and be utilized over prolonged periods of time with only minor recharging.

After investigation, it has been found compositions of matter which are thought advantageous in several respects over the prior art compositions, particularly in their capacity to hold up under long periods of time and under a wide range of severe commercial operating conditions.

Accordingly, one aspect of the present invention provides a parting and lubrication system which significantly minimizes periodic swabbing or treatment of the molds during glassware production.

From another aspect, the present invention affords an aqueous composition and a method which provides a uniform distribution of lubricant which can be bonded to a working surface without substantial loss of lubricants.

From another aspect, the present invention provides an improved parting and lubricating system which improves the pack of glassware formed.

A further aspect of the subject invention provides effective compositions of matter suitable for coating molds used in casting or forming materials at high temperatures without substantially emitting organic pollutants to the atmosphere.

Still another aspect of the present invention is to provide a parting and lubricating system for glassware molds which may be conveniently applied away from and prior to the production process, affording an operator safer working conditions remote from heat and noise.

Yet still another aspect of the present invention is to provide a lubrication system for glassware molds which produces a substantially uniform glass article.

These and other aspects and features of the present invention will become apparent from the following description.

This invention relates to a release and lubricating composition comprising an aqueous dispersion of a mixture of tungsten disulfide having a lamellar-hexagonal crystalline structure, a silicate, and a setting agent. Also, this invention relates to a method of forming a lubricating and release coating on working surfaces comprising applying an aqueous dispersion of a mixture of tungsten disulfide having a lamellar-hexagonal crystalline structure, a silicate, and a separating agent to the surfaces to be coated and removing the water from the surface and dispersion to affix the silicate and tungsten disulfide to the surfaces to form a thin coating thereon.

By the term "dispersion" as used herein, it is meant a system of minute solid particles relatively distinct from one another and generally suspended in a fluid or liquid medium. This dispersion may be either in highly liquid form or a highly viscous or paste-like form.

In accordance with this invention the tungsten disulfide is present in finely divided state. Generally, a particle size smaller than 2 microns is very suitable for the compositions herein disclosed. The tungsten disulfide herein employed should have a lamellar-hexagonal crystalline structure.

Tungsten disulfide exhibits a low coefficient of friction averaging between about 0.025 to about 0.060, and offers excellent release characteristics along with thermal stability.

During its use on molds and surfaces thereof, it is believed that the tungsten disulfide partially forms tungsten oxides at about 900°F., which seemingly also enhance and provide low friction and release properties.

In accordance with this invention, the tungsten disulfide may be readily admixed with graphite or carbon. The graphite or carbon used may be any of the various carbon blacks, flake, and colloidal graphite or conventional graphite known to the trade. Further, it is understood that either natural or synthetic forms of graphite can be satisfactorily employed in accordance with the present invention. The carbon or graphite may be of technical or spectro grade which may be ball milled, if need be, to reduce particle size. The particle size may range from between about 10 to 200 microns. preferably, the particle size may range from about 75 microns or less. Based on the weight of the total composition, the weight of tungsten disulfide may range from 30 to about 70 percent, whereas the amount of graphite may vary. The amount of graphite may be from 0 to about 50 weight percent. Aside from the lubricity it is believed that the tungsten disulfide inhibits the oxidation of any carbon or graphite which is added to the compositions herein to provide lubricity and glass release.

The silicates used in the process and compositions of this invention are those silicates generally of inorganic bases. Exemplary of such silicates are sodium silicate, potassium silicate, and lithium silicate. The preferred inorganic silicate is sodium silicate since this silicate is less expensive than potassium silicate. However, the organic silicates may be satisfactorily employed and include guanidine silicate, tetramethylammonium silicate, and tetraethanolammonium silicate.

The amount of silicate utilized in accordance with this invention is that sufficient to bind the particles of tungsten disulfide so that they are bonded to each other and the material substrate. Typically, from about 15 to about 25 weight percent of a silicate based upon the total weight of the aqueous dispersion.

The best range for sodium silicate solutions is that in which the $SiO_2/Na_2O$ ratio by weight is 1.0 to 2.5, and the best range for potassium silicate solutions is that in which the $SiO_2/K_2O$ ratio by weight is 1.0 to about 3.0. Silicates of strong bases are readily available from commercial sources. All such commercially available silicates are useful in preparing and applying the compositions herein described.

The setting agents employed herein denote certain compounds that greatly enhance the usefulness of the subject invention. Although the setting agents seemingly function as curing agents for the silicates, they apparently also function as buffers to allow water of crystalization to gradually leave a coated surface upon drying or removal of the aqueous material. The setting agent seemingly serves to tie up any water momentarily so that there is no burst of steam or bubbling on the surface. In this regard, it is understood that the setting agent herein described enhance the silicates of this invention, although it is only hypothesized as to their specific functional characteristics. The amount of these setting agents may range from about 1 to about 10 weight percent of the total aqueous dispersion.

In general, setting agents are acidic or heavy metal compounds, which seemingly react with the silicate causing a gradual removal of water. The setting agents used in the subject invention include zinc oxide, calcium chloride, magnesium sulfate, aluminum sulfate, sodium borate, sodium metaborate and sodium fluorosilicate. Also an effective setting agent includes the kaolinitic clays and minerals which heat-decompose into acidic compounds. These setting agents may be readily admixed with the silicates of this invention by any of the conventional methods known to the art.

In carrying out the process of this invention, it is generally desirable to clean the surface of the glass forming equipment before hand to remove all contamination such as metal oxides, loose particles, oil, dirt, and the like to assure a better adhesion and longer life of the coating.

In treating molds and mold parts with the compositions herein, their application and subsequent drying may be carried out in the straightforward manner. Simply, the treatment of a mold or mold part consists in applying a dispersion described herein and allowing the water to be evaporated or removed by gentle heating or baking the particular coated part. A preferred method is to apply the coating compositions of this invention and air dry the same until the water is substantially removed. Thereafter the coating is subjected to a higher temperature to remove any residual water. It is understood that water in the aqueous dispersion may be removed by any number of conventional means. After a uniform and smooth, thin coating is produced on the metal surface, the mold is preferrably gently heated or baked at a low temperature to drive off the water and thereafter at an elevation temperature to affix and bond the tungsten disulfide to the mold surface.

Subjecting the compositions herein to temperatures between about 100°F., to about 300°F., generally for a period of 30 minutes to 1 hour serves to adequately remove the water during the initial period of heating. Thereafter, heating at slightly increased temperature, that is between about 300°F., to about 700°F., for a period of about several minutes to about 2 hours serves to set the binder and remove any traces of water or any other volatile constitutents. Since glassware molds often must be preheated to an elevated temperature prior to installation and use on glassware-producing machines, it is convenient to utilize the preheating period for the higher baking period.

The dispersion or mixtures of the subject invention may be applied to the mold or mold part by any of the conventional means such as brushing, spraying, dipping, or blowing onto the surface. Spraying is preferred.

After affixing the release and lubricating composition herein disclosed, the composition adheres tenaciously to the mold in a thin, uniform coating of silicate and tungsten disulfide. Although the coating is generally of microscopic thickness, coating thicknesses may vary considerably depending upon the amount applied and may range between about 0.0004 and 0.005 inch. It is preferred that there be between about 0.0006 and 0.002 inch of coating material. The coating itself is thermally stable, offers good oxidation resistance and allows for adequate heat transfer. As regards lubricity, it has been demonstrated that the compositions of the subject invention render high temperature lubricity to a given surface, that is, lubricity is particularly noted at temperatures from between about 600° to 1700°F.

While the heating operation serves to drive off any water or other volatile constituents, it also sets the silicate and stabilizes the tungsten disulfide particles upon the surface of the mold with the result that a firmly adherent coating is produced. Again, because of the firm adherence and durability of the coating obtained in the foregoing manner, it is intregally bonded to the mold as compared to the many superficial mold coatings of the prior art.

It is often found that wetting agents be used in conjunction with the foregoing compositions. Wetting agents may be readily employed to facilitate dispersion of any of the water-insoluble ingredients such as tungsten disulfide and graphite and to stabilize the resulting dispersion. A wide range of wetting agents are available and any of the conventional wetting agents may be utilized in conjunction with the subject invention. Further, thickening agents and the like may also be employed to achieve a desired fluidity, and pigments or fillers such as silicate, talc and diatomaceous earth may be included, if desired, in order to facilitate complete covering of the desired mold surface by making the coating readily visible to the operator as it is applied.

Also, additive constituents which may advantageously, but optionally, included are compounds known to improve oxidation resistance of the composition, thermal stability and/or conductivity of the composition and wear resistance thereof. Useful additives of this category include barium fluoride, silicon fluoride, zinc phosphate, boron carbide, and calcium fluoride.

The results obtained through use of the aforedescribed compositions demonstrate that the ordinary operational life on conventional machines is many times greater than the operational life of other coatings. Further, by the composition herein disclosed and claimed, there is produced great savings in time and cost, since it is now possible to operate a glass-forming and handling equipment for considerably longer periods of operational time, as well as to appreciatively minimize the necessity of hand swabbing the molding equipment as extensively as before.

Although the present formulations and methods are addressed particularly to glass-forming machines and associated parts, it will be appreciated that such compositions and methods are also very useful for other molds when parting and lubrication are necessary. Thus, the herein described compositions may be useful for metal forming industry, such as for zinc, aluminum, etc. Also, said compositions may be useful for molds for forming elastomers, rubber articles, plastics, etc.

The following Examples are offered to illustrate the invention in more detail.

EXAMPLE I

A conventional cast iron blank mold employed in molding 12 oz., glass bottles was cleaned by preheating to about 700°F., to remove any residual organic materials, such as oils, etc. The surface of the blank mold was then lightly sand-blasted to remove any residual scale, rust, or other foreign materials therefrom.

A coating material was prepared by mixing 1,610 grams tungsten disulfide having a lamellar-hexagonal crystalline structure, and an average particle size of about 0.6 microns with 805 grams graphite having an average particle size of about 70 microns. This mixture of lubricants was introduced into 1,400 grams of water into which was placed 24 grams of a sulfonate of oleic acid. Into this slurry was placed about 1,614 grams of sodium silicate having a $SiO_2/Na_2O$ ratio of 2.40 and a 52° Baume at 68°F., and mixed with about 1000 grams of water, introduced into a ball mill and mixed therein for approximately 3 hours. This formulation produced about 15 lbs., of coating material which had a viscosity of about 5 seconds as determined by a No. 5 Zahn cup viscometer.

The mixture was sprayed by a spray gun over the complete sandblasted surface of the prepared mold. The coating was allowed to be air dried at room temperature for about 30 minutes. Thereafter, the sprayed mold was cured for 45 minutes at 500°F., in an air circulating oven. The treated mold was removed and installed in a conventional glass forming machine. The thickness of the coating after spraying and allowing to air dry was about 0.0015 inch.

The blank mold treated in accordance with this invention was used to produce a standard 12 oz., bottle without additional swabbing. The coated mold formed over 15,000 bottles and performed satisfactory for at least 24 hours with no supplementary lubrication. It was noted that the bottles produced by the use of this mold mix formed bottles of uniform wall thickness. Further, there were observed no "carbon marks" upon the surfaces of the bottles produced. The bottles produced where of excellent quality.

EXAMPLE II

The precoated molds are related parts as prepared in Example I were swabbed with a conventional petroleum-based graphite compound (about 2% graphite and 98% oil) at intervals from 45 to 60 minutes to produce some 45,000 bottles over a 72 hour period.

At the same rate of production, another mold and related parts were employed to produce bottles, the molds and related parts of this run not being treated by precoating. These uncoated molds and related parts required swabbing with the same conventional petroleum-based graphite swabbing compound every 7 to 10 minutes. Further, these molds without the precoating had to be removed from the machine and cleaned after about 30 hours of operation in order to continue further production.

EXAMPLE III

The composition as recited in Example I was employed to coat the molding surfaces of a rotary press ware machine for forming 12 oz., drinking glasses. The glasses so formed were of excellent quality and had no carbon marks upon the surfaces of the glasses.

While the subject invention is described in detail in the several embodiments which this invention may assume in practice, it will be appreciated to those skilled in the art that changes and modifications may be made without departing from this invention, the scope of which is defined in the following claims.

I claim:

1. A method of forming a lubricating and release coating on surfaces of molds and related parts, comprising applying an aqueous dispersion of a mixture of about 30 to about 70 weight percent tungsten disulfide having a lamellar-hexagonal crystalline structure, said tungsten disulfide having an average particle size of less than 2 microns, from about 15 to about 25 weight percent of a silicate selected from the group consisting of sodium silicate, potassium silicate, lithium silicate, guanidine silicate, tetramethylammonium silicate, tetraethanolammonium silicate, and mixtures thereof, and from about 1 to about 10 weight percent of a setting agent to the surface and part to be coated, said setting agent being a member selected from the group consisting of zinc oxide, calcium chloride, magnesium sulfate, aluminum sulfate, sodium borate, sodium metaborate, sodium fluorosilicate, kaolinitic clays and minerals, and mixtures thereof, and heating said molds and related parts to affix the silicate to the surface to form a thin coating thereon.

2. A method of forming a lubricating and release coating on surfaces of molds and related parts, comprising applying an aqueous dispersion of a mixture of about 30 to about 70 weight percent tungsten disulfide having a lamellar-hexagonal crystalline structure, said tungsten disulfide having an average particle size of less than 2 microns, from about 15 to about 25 weight percent of an alkali metal silicate selected from the group consisting of sodium silicate, potassium silicate, lithium silicate, and mixtures thereof, and from about 1 to about 10 weight percent of a setting agent to the molds and related parts to be coated, said setting agent being a member selected from a group comprised of zinc oxide, calcium chloride, magnesium sulfate, aluminum sulfate, sodium borate, sodium metaborate, sodium fluorosilicate, kaolinitic clays and minerals, and mixtures thereof, heating said molds and parts to affix the silicate to the surface to form a thin coating thereon.

3. A method as recited in claim 2 wherein after the surfaces of the molds and related parts are coated, an additional coating of dispersion is periodically applied.

4. A method of molding a glass article, comprising treating the surfaces of a mold and related parts that come in contact with a hot glass body with a composition comprising an aqueous dispersion of a mixture of about 30 to about 70 weight percent tungsten disulfide, from about 15 to about 25 weight percent of a silicate selected from the group consisting of sodium silicate, potassium silicate, lithium silicate, guanidine silicate, tetramethylammonium silicate, tetraethanolammonium silicate, and mixtures thereof, and from about 1 to about 10 weight percent of a setting agent, said setting agent being a member selected from the group consisting of zinc oxide, calcium chloride, magnesium sulfate, aluminum sulfate, sodium borate, sodium metaborate, sodium fluorosilicate, kaolinitic clays and minerals, and mixtures thereof, heating the surface and the dispersion to remove the water to form a coating on said surfaces, contacting the coated surfaces with the hot glass body and shaping said body to a final form.

5. A treated metal surface comprising a molding surface having securely adhered thereto a coating comprising tungsten disulfide, said tungsten disulfide having a lamellar-hexagonal crystalline structure and an average particle size of less than 2 microns, a silicate selected from the group consisting of sodium silicate, potassium silicate, lithium silicate, guanidine silicate, tetramethylammonium silicate, tetraethanolammonium silicate, and mixtures thereof, and a setting agent selected from the group consisting of zinc oxide, calcium chloride, magnesium sulfate, aluminum sulfate, sodium borate, sodium metaborate, sodium fluorosilicate, kaolinitic clays and minerals, and mixtures thereof, dispersed through the mixture, said coating being of a thickness between 0.0004 to about 0.005 inch wherein said coating is prepared from an aqueous dispersion of a mixture of about 30 to about 70 weight percent of said tungsten disulfide, from about 15 to about 25 weight percent of said silicate of said silicate and from about 1 to about 10 weight percent of said setting agent.

* * * * *